United States Patent Office 3,194,711
Patented July 13, 1965

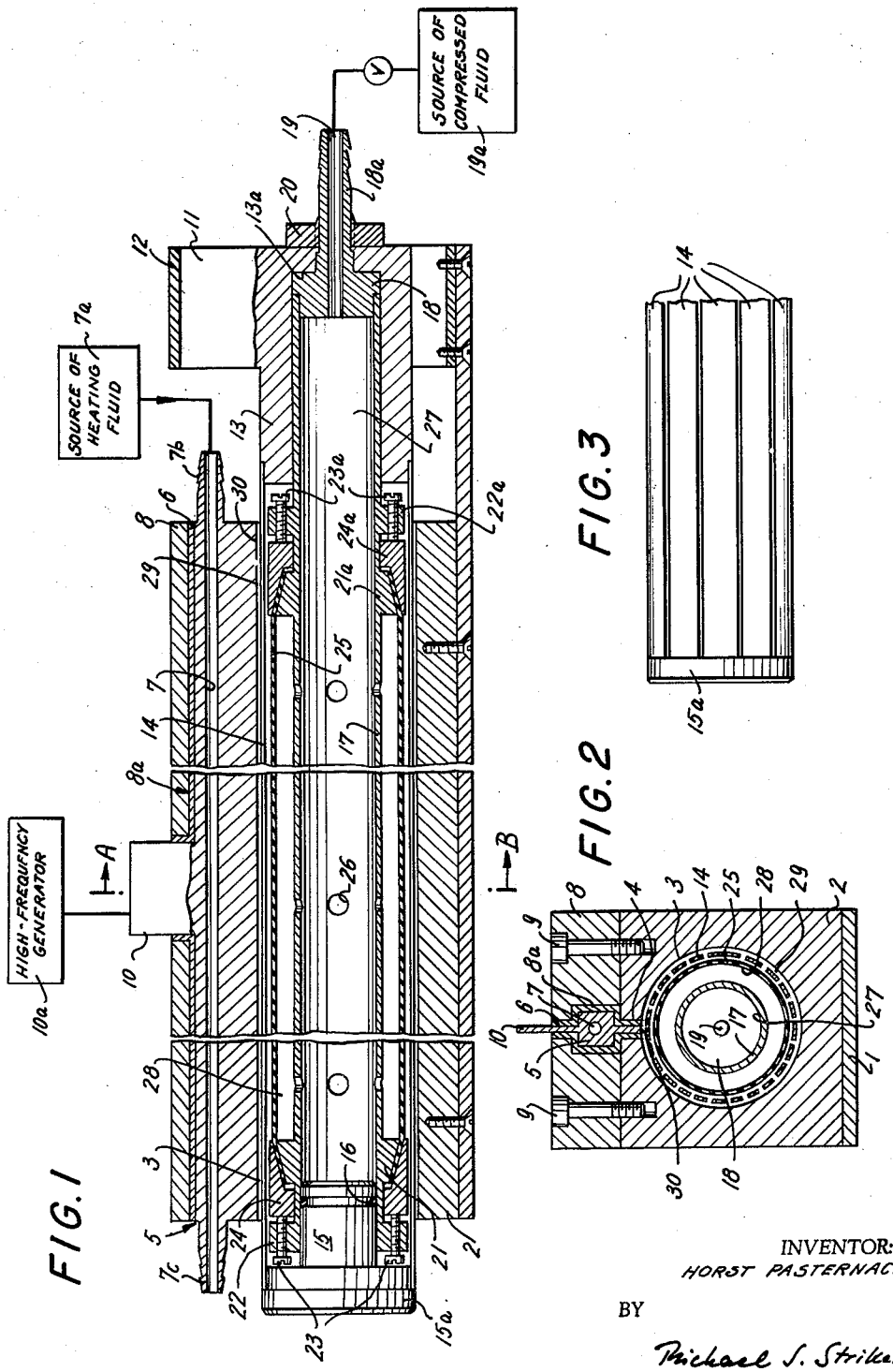

3,194,711
APPARATUS FOR SEAM WELDING OVERLAPPING EDGE PORTIONS OF ROLLED PLASTIC SHEETS
Horst Pasternack, Essen, Germany, assignor to Wasag-Chemie, A.G., Essen, Germany
Filed June 29, 1962, Ser. No. 206,321
Claims priority, application Germany, July 5, 1961, W 30,298
18 Claims. (Cl. 156—380)

The present invention relates to an apparatus for induction welding of plastic tubing, and more particularly to an apparatus for seam welding overlapping edge portions of plastic tubes with heat generated by high-frequency electric current.

An important object of the invention is to provide an apparatus for seam welding of plastic tubes which is constructed and assembled in such a way that it can produce a seam of greatly improved smoothness, of uniform strength, of constant cross-section and of superior appearance than was heretofore possible in conventional welding apparatus of which I am aware at this time.

Another object of the invention is to provide a welding apparatus of the just outlined characteristics wherein rolled sheets or foils which preferably consist of plastic material may be transformed into tubes of constant diameter and wherein the thickness of seams formed by fusion of longitudinally extending overlapping edge portions of such sheets equals or at least approximates the thickness of the remaining zones of the ultimate products.

A further object of the invention is to provide an improved expanding or stretching assembly for a rolled plastic sheet or foil which may be utilized in welding apparatus of the above outlined characteristics.

An additional object of the invention is to provide a welding apparatus wherein a plastic sheet or foil may be transformed into a tube within exceptionally short periods of time and wherein the likelihood that the high-frequency current would puncture the plastic material during welding is practically non-existent.

Still another object of my invention is to provide an apparatus of the above outlined characteristics wherein the plastic sheet is subjected to comparatively low pressure during a welding operation without in any way impairing the appearance or quality of the seam.

A concomitant object of the invention is to provide a novel mold structure for reception of a plastic sheet during welding.

With the above objects in view, the invention resides in the provision of an apparatus which is utilized for seam welding overlapping longitudinal edge portions of rolled plastic and like sheets and for thereby transforming such sheets into tubular bodies. This apparatus comprises a mold member which is provided with an elongated bore and with an elongated slot which communicates with the bore, an electrode which is insulated from the mold member and which comprises an elongated portion extending into and at least partially filling the slot, and radially outwardly expansible spreading means coaxially received in the bore and defining with the mold member and with the electrode an annular space for reception of a rolled sheet in such a way that one longitudinal edge portion of the sheet abuts against the electrode whereby, when the circuit of a high-frequency generator which is connected to the electrode is completed, the overlapping edge portions of the sheet are welded to each other while the sheet is pressed against the walls bounding the bore of the mold member.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

FIG. 1 is a longitudinal central vertical section through a welding apparatus which embodies the invention;

FIG. 2 is a transverse vertical section as seen in the direction of arrows from the line A–B of FIG. 1; and FIG. 3 is a fragmentary elevational view of certain components which form part of the means for expanding a rolled plastic sheet when the welding operation is being carried out in the apparatus of FIGS. 1 and 2.

Referring now in greater detail to the illustrated embodiments, and first to FIGS. 1 and 2, there is shown a welding apparatus which comprises a base plate or support 1 for an elongated tubular receptacle or female mold member 2. This mold member is provided with an elongated horizontal cylindrical bore 3 whose diameter corresponds to the desired outer diameter of the ultimate product. The mold member 2 is formed with an elongated slot 4 which communicates with and is parallel to the axis of the bore 3. This slot 4 receives an elongated inner portion 3θ of an electrode 5 which is surrounded by a layer 6 of insulating material. The main body portion of the electrode 5 is received in a suitably configurated recess 8a of a cover 8 which is detachably secured to the upper side of the mold member 2 by a series of bolts 9. It will be noted that the upper side of the mold member 2 is spaced from the bore 3 and that the slot 4 extends substantially radially toward the upper side to communicate with the recess 8a. The arrangement is preferably such that the insulating layer 6 which surrounds the electrode 5 is bonded to the walls surrounding the recess 8a and the slot 4 so that the inner portion 3θ of the electrode and the inner portion of the layer 6 completely fill the slot 4. As shown in FIG. 2, the electrode 5 and the insulating layer 6 cooperate with the mold member 2 to form a continuous wall about the bore 3. The main body portion of the electrode 5 is provided with one or more longitudinally extending channels or bores 7 which receive a heating fluid when the welding apparatus is in actual use. This heating fluid is admitted from a source 7a through one of the nipples 7b, 7c provided on the electrode 5, and spent fluid is discharged through the other nipple so that the circulating fluid internally heats and maintains the electrode at an optimum temperature. An upwardly extending terminal 10 of the electrode 5 is connected to one phase of a high-frequency generator 10a.

The bore 3 of the mold member 2 accommodates a portion of a specially constructed spreading means which includes a holder 12 secured to the base plate 1 and supporting a rib 11 which forms part of or which is secured to a tubular carrier 13. The parts 11–13 of the spreading means are located at the right-hand end of the mold member 2, as viewed in FIG. 1. The carrier 13 accommodates one longitudinal end of a tubular distributor 17 which extends with play through and beyond the bore 3 and which is provided with external annular flanges 22, 22a whose distance from each other approximates the axial length of the mold member 2. The open right-hand end of the distributor 17 receives a portion of a hollow plug 18 which is accommodated in and whose nozzle 18a extends coaxially through a bore provided in the bottom wall of the carrier 13. This nozzle 18a is externally threaded to take a nut 20 which is adjacent to the outer side of the carrier. The passage 19 of the nozzle 18a communicates with a suitable conduit leading to a source 19a of compressed fluid which source may assume the form of an air compressor or the like. The nut 20 cooperates with an internal shoulder 13a of the carrier 13 to lock the plug 18 in the position shown in FIG. 1.

The left-hand end of the internal space 27 in the distributor 17 receives and is sealed by a plunger 15 which is surrounded by the flange 22 and which is provided with a larger-diameter head 15a. This head 15a cooperates with the carrier 13 to support the respective ends of elongated expansion transmitting strips 14 (see FIG. 3) of flexible metallic material which are inwardly adjacent to the wall bounding the bore 3 and which together form a slitted sleeve for an elastically deformable hose 25. The plunger 15 is formed with a peripheral groove for an annular sealing element 16 which prevents escape of compressed fluid through the left-hand end of the distributor 17. This distributor is formed with a plurality of radial apertures 26 through which a compressed fluid admitted through the passage 19 and filling the space 27 may enter the internal compartment 28 of the hose 25. The ends of the strips 14 are welded, bolted or otherwise safely secured to the head 15a and to the carrier 13. Since the holder 12 and the rib 11 provide a rigid connection between the base plate 1 and the carrier 13, and since this carrier fixedly supports the distributor 17, the latter is accurately centered in the bore 3 and maintains the plunger 15 in coaxial alignment with the mold member 2. The plug 18 is preferably welded or otherwise permanently secured to the distributor 17 so that the nut 20 holds the distributor against axial displacements in the bore 3.

The means for detachably securing the end portions of the elastic hose 25 to the distributor 17 comprises a pair of fixed conical abutment members 21, 21a which assume the form of annuli integral with and surrounding the distributor 17, a pair of annular clamping elements or jaws 24, 24a which are axially movably received between the parts 21, 22 and 21a, 22a, respectively, and adjusting screws 23, 23a which are parallel with the axis of the bore 3 and which are screwed into the flanges 22, 22a so that their tips may transmit axial motion to the clamping elements 24, 24a. The left-hand end portion of the hose 25 (as viewed in FIG. 1) is clamped between the cooperating conical faces of the abutment member 21 and clamping element 24 and is maintained in such clamped position by the screw or screws 23 which exert a requisite axial force upon the element 24. The other end portion of the hose 25 is clamped in similar fashion between the conical faces of the abutment member 21a and clamping element 24a and is retained in such position by the screw or screws 23a.

The wall bounding the bore 3 defines with the strips 14 of the expanding means 11–26, in the contracted position thereof, an annular space 29 which receives an unwelded rolled plastic sheet or foil in such a way that one longitudinal edge portion of the sheet is adjacent to the inner portion 30 of the electrode 5.

The apparatus of my invention is operated as follows:

In the first step, a sheet or foil of plastic material is introduced into the annular space 29, preferably from the left-hand end of the apparatus, as viewed in FIG. 1, so that the sheet is rolled and assumes the shape of a tube by extending along the wall bounding the bore 3 and that the overlapping longitudinal edge portions of such tube are adjacent to the inner portion 30 of the electrode 5. In the next step, the operator admits compressed fluid into the internal space 27 of the distributor 17 whereby the fluid penetrates through the radial apertures 26 and fills the internal compartment 28 to move the expanding means to its expanded position, i.e., to expand the hose 25 radially outwardly and to thereby press the slitted sleeve consisting of strips 14 against the inner side of the plastic tube in the annular space 29. At the same time, fluid filling the space 27 acts against the right-hand end face of the plunger 15 and urges this plunger in a direction to the left, as viewed in FIG. 1, to thereby stretch the strips 14 because the carrier 13 remains stationary. In other words, the strips 14 are subjected to a stretching force by compressed fluid acting against the plunger 15 and to a radially outwardly oriented expanding force which is transmitted thereto by the hose 25. This insures that the expanding means maintains the tube in full face-to-face abutment with the wall bounding the bore 3 whereby the ultimate product assumes the form of a true cylinder. The overlapping longitudinal edge portions of the plastic tube are pressed against the inner portion 30 of the electrode 5.

When the circuit of the high-frequency generator 10a is completed, the overlapping edge portions of the plastic tube are brought to fusion temperature and are automatically welded to each other. The distributor 17 may be grounded so that heating action takes place between the end portion 30 and the entire or a selected portion of the distributor. In order to accelerate the welding operation, a hot fluid medium is caused to circulate through the channel 7 and to heat the electrode 5 to optimum temperature.

It will be noted that the apparatus of my invention is capable of transforming a rolled plastic sheet into a plastic tube of predetermined diameter and that the seam formed by this apparatus is smooth because the overlapping longitudinal edge portions of the sheet are pressed against the inner portion 30 of the electrode 5 with requisite force to insure that the thickness of the seam approximates or equals the thickness of the remainder of the tubular body. The cross-section of the seam is constant throughout because the strips 14 and the hose 25 subject all zones of the tube to uniform pressure.

The strips 14 maintain the elastic hose 25 out of contact with the workpiece and permit convenient withdrawal of the ultimate product as soon as the pressure prevailing in the compartment 28 is relaxed.

Without further analysis, the foregoing will so fully reveal the gist of the present invention that others can, by applying current knowledge, readily adapt it for various applications without omitting features that, from the standpoint of the prior art, fairly constitute essential characteristics of the generic and specific aspects of this invention, and therefore, such adaptations should and are intended to be comprehended within the meaning and range of equivalence of the following claims.

What is claimed as new and desired to be secured by Letters Patent is:

1. In an apparatus for welding weldable overlapping longitudinal edge portions of rolled sheets and for thereby transforming such sheets into tubular bodies, in combination, a mold member having an elongated bore, wall means bounding said bore, and an elongated slot communicating with said bore; an electrode having an elongated portion extending into and at least nearly filling said slot; and radially outwardly expansible spreading means received in said bore, said spreading means being movable between a contracted position in which said spreading means defines with said wall means and with said electrode an annular space for reception of a rolled sheet with the overlapping edge portion of the sheet abutting against said elongated portion of said electrode, and an expanded position in which said spreading means presses the overlapping edge portion of the sheet against said electrode and presses the remaining portions of the sheet against said wall means.

2. In an apparatus for seam welding overlapping longitudinally extending edge portions of rolled plastic sheets and for thereby transforming such sheets into plastic tubes, in combination, a mold member having an elongated bore, cylindrical wall means bounding said bore and an elongated slot communicating with and extending substantially radially outwardly from said bore; an electrode having an elongated portion extending into and at least partially filling said slot; means for insulating said electrode from said mold member; and radially outwardly expansible spreading means coaxially received in said bore, said spreading means being movable between a contracted position in which said spreading means defines with said wall means and with said electrode an annular space for reception of a rolled plastic sheet with the overlapping longitudinal edge portion of the sheet abutting against said elongated portion of said electrode, and an expanded position in which said spreading means presses the overlapping edge portion of the sheet against said electrode and presses the remaining portions of the sheet against said wall means.

3. In an apparatus for welding weldable overlapping longitudinal edge portions of rolled sheets and for thereby transforming such sheets into tubular bodies, in combination, support means; a mold member mounted on said support means, said mold member having an elongated bore, wall means bounding said bore, and an elongated slot communicating with said bore; an electrode having an elongated portion extending into and at least nearly filling said slot; and radially outwardly expansible spreading means received in said bore, said spreading means being movable between a contracted position in which said spreading means defines with said wall means and with said electrode an annular space for reception of a rolled sheet with the overlapping edge portion of the sheet abutting against said elongated portion of said electrode, and an expanded position in which said spreading means presses the overlapping edge portion of the sheet against said electrode and presses the remaining portions of the sheet against said wall means.

4. In an apparatus for welding weldable overlapping longitudinal edge portions of rolled sheets and for thereby transforming such sheets into tubular bodies, in combination, a mold member having an upper side, an elongated substantially horizontal bore spaced from said upper side, wall means bounding said bore, and an elongated slot communicating with said bore and extending to said upper side; cover means adjacent to the upper side of said mold member and having recess means communicating with said slot; means for detachably securing said cover means to the upper side of said mold member; an electrode having a first portion received in said recess means and an elongated second portion received in and at least partially filling said slot; means for insulating said electrode from said mold member and from said cover means; and radially outwardly expansible spreading means received in said bore, said spreading means being movable between a contracted position in which said spreading means defines with said wall means and with said electrode an annular space for reception of a rolled sheet with the overlapping edge portion of the sheet abutting against the second portion of said elongated portion of said electrode, and an expanded position in which said spreading means presses the overlapping edge portion of the sheet against said electrode and presses the remaining portions of the sheet against said wall means.

5. In an apparatus for seam welding overlapping longitudinally extending edge portions of rolled plastic sheets and for thereby transforming such sheets into plastic tubes, in combination, a mold member having an elongated bore, cylindrical wall means bounding said bore and an elongated slot communicating with and extending substantially radially outwardly from said bore; an electrode having an elongated portion extending into and at least partially filling said slot and elongated channel means; a source of heating fluid connected with said channel means so that the fluid may internally heat said electrode; means for insulating said electrode from said mold member; and radially outwardly expansible spreading means coaxially received in said bore, said spreading means being movable between a contracted position in which said spreading means defines with said wall means and with said electrode an annular space for reception of a rolled plastic sheet with the overlapping longitudinal edge portion of the sheet abutting against said elongated portion of said electrode, and an expanded position in which said spreading means presses the overlapping edge portion of the sheet against said electrode and presses the remaining portions of the sheet against said wall means.

6. In an apparatus for seam welding overlapping longitudinally extending edge portions of rolled plastic sheets and for thereby transforming such sheets into plastic tubes, in combination, a mold member having an elongated bore, cylindrical wall means bounding said bore and an elongated slot communicating with and extending substantially radially outwardly from said bore; an electrode having an elongated portion extending into and at least partially filling said slot; means for insulating said electrode from said mold member; and radially outwardly expansible spreading means coaxially received in said bore and defining with said wall means and with said electrode an annular space for reception of a rolled plastic sheet with the overlapping longitudinal edge portion of the sheet abutting against said elongated portion of said electrode, said spreading means comprising a plurality of elongated metallic strips forming a slitted sleeve which is inwardly adjacent to said wall means, elastically deformable hose means received in said sleeve, and a source of pressure fluid operatively connected with said hose means so that, when fluid is admitted into said hose means the strips of said sleeve expand into abutment with a plastic sheet in said annular space.

7. A combination as set forth in claim 6, further comprising fixed carrier means for coaxially supporting said sleeve and said hose means in said bore.

8. A combination as set forth in claim 7, wherein said carrier means is a tube adjacent to one end of said bore, said spreading means further comprising apertured tubular distributor means having a first end secured to said carrier means, said distributor means coaxially extending through said hose means and having a second end adjacent to the other end of said bore, plunger means reciprocably received in the second end of said distributor means, and means connecting the first end of said distributor means with said source so that compressed fluid admitted from said source may flow through said distributor means and into said hose means, each of said strips having a first end operatively connected with said plunger means and a second end connected with said carrier means so that compressed fluid which is admitted into said distributor means urges said plunger means away from said carrier means to automatically stretch said strips.

9. A combination as set forth in claim 8, wherein the means connecting said distributor means with said source comprises a nozzle secured to said distributor means and extending through said carrier means.

10. A combination as set forth in claim 8, wherein said distributor means has a plurality of radial apertures through which compressed fluid admitted from said source may flow into the interior of said hose means.

11. A combination as set forth in claim 8, wherein said hose means comprises a first end portion adjacent to one end of said bore and a second end portion which is adjacent to the other end of said bore, said distributor means comprising first and second annular abutment means respectively received in the first and second end portions of said hose means, and said spreading means further comprising means for sealingly clamping said end portions to the respective abutment means.

12. A combination as set forth in claim 11, wherein said clamping means comprises a first and a second annular clamping element axially movably surrounding the respective abutment means, and means for pressing said clamping elements against the respective end portions of said hose means.

13. In an apparatus for seam welding overlapping longitudinal edge portions of rolled plastic sheets and for thereby transforming such sheets into plastic tubes, in combination, a mold member having an elongated cylindrical bore, wall means bounding said bore, and an elongated slot parallel with the axis of and communicating with said bore; an electrode having an elongated inner portion extending into and substantially filling said slot; means for insulation said electrode from said mold member, and radially outwardly expansible spreading means, said spreading means comprising an elongated tubular distributor coaxially extending into said bore and spaced from said wall means, said distributor having substantially radial aperture means, a first end and a second end, fixed carrier means supporting the first end of said distributor, a plunger reciprocably received in the second end of said distributor, a plurality of elongated metallic strips having ends fixed to said plunger and to said carrier means, said strips together forming a slitted sleeve coaxially surrounding and spaced from said distributor, said sleeve and said wall means defining between themselves an elongated annular space adapted to receive a rolled plastic sheet with the overlapping edge portion of the sheet abutting against said elongated portion of said electrode, an elongated tubular hose of elastically deformable material received in said sleeve and having spaced end portions externally secured to said distributor, and a source of compressed fluid connected with the first end of said distributor so that compressed fluid admitted into said distributor tends to move said plunger away from said carrier means to thereby stretch said strips and that compressed fluid admitted into said hose through said aperture means expands said sleeve and thereby presses a plastic sheet contained in said annular space against said wall means.

14. In an apparatus for seam welding overlapping longitudinal edge portions of rolled plastic sheets and for thereby transforming such sheets into plastic tubes, in combination, a mold member having an elongated cylindrical bore, wall means bounding said bore, and an elongated slot parallel with the axis of and communicating with said bore; an electrode having an elongated inner portion extending into and substantially filling said slot, said electrode provided with at least one longitudinally extending channel; a source of heating fluid connected with said channel for internally heating said electrode; means for insulating said electrode from said mold member; and radially outwardly expansible spreading means, said spreading means comprising an elongated tubular distributor coaxially extending into said bore and spaced from said wall means, said distributor having substantially radial aperture means, a first end and a second end, fixed carrier means supporting the first end of said distributor, a plunger reciprocably received in the second end of said distributor, a plurality of elongated metallic strips having ends fixed to said plunger and to said carrier means, said strips together forming a slitted sleeve coaxially surrounding and spaced from said distributor, said sleeve and said wall means defining between themselves an elongated annular space adapted to receive a rolled plastic sheet with the overlapping edge portion of the sheet abutting against said elongated portion of said electrode, an elongated tubular hose of elastically deformable material received in said sleeve and having spaced end portions externally secured to said distributor, and a source of compressed fluid connected with the first end of said distributor so that compressed fluid admitted into said distributor tends to move said plunger away from said carrier means to thereby stretch said strips and that compressed fluid admitted into said hose through said aperture means expands said sleeve and thereby presses a plastic sheet contained in said annular space against said wall means.

15. In an apparatus for welding overlapping longitudinal edge portions of rolled sheets and for thereby transforming such sheets into tubular bodies, in combination, a mold member having an elongated bore, wall means bounding said bore, and an elongated slot communicating with said bore; an electrode having an elongated portion extending into and at least nearly filling said slot; a high-frequency generator having one phase connected with said electrode; and radially outwardly expansible spreading means received in said bore, said spreading means being movable between a contracted position in which said spreading means defines with said wall means and with said electrode an annular space for reception of a rolled sheet with the overlapping edge portion of the sheet abutting against said elongated portion of said electrode, and an expanded position in which said spreading means presses the overlapping edge portion of the sheet against said electrode and presses the remaining portions of the sheet against said wall means, said spreading means comprising a grounded component spaced from said electrode and located in said bore.

16. In an apparatus for welding weldable overlapping longitudinal edge portions of rolled sheets and for thereby transforming such sheets into tubular bodies, in combination, a mold member having an elongated bore, wall means bounding said bore, and an elongated slot communicating with said bore; an electrode having an elongated portion extending into and at least partially filling said slot; and elongated radially outwardly expansible spreading means received in said bore and extending at least along the entire length of said elongated portion of said electrode, said spreading means being movable between a contracted position to define with said wall means and with said electrode an elongated annular space for reception of an elongated rolled sheet with the overlapping edge portion of the sheet abutting against said electrode, and an expanded position in which the overlapping edge portion of the sheet is pressed against said elongated portion of said electrode substantially along its entire length and the remaining portions of the sheet are pressed against said wall means.

17. A structure as set forth in claim 16, further comprising actuating means for moving said spreading means from said contracted to said expanded position, said actuating means being arranged to press said spreading means against said elongated portion of said electrode with substantially uniform pressure along its entire length and to press the remaining portions of the sheet against said wall means with a pressure substantially equal to that exerted against said overlapping edge portion.

18. In an apparatus for welding weldable overlapping longitudinal edge portions of rolled sheets and for thereby transforming such sheets into tubular bodies, in combination, a mold member having an elongated bore, wall means bounding said bore, and an elongated slot communicating with said bore; an electrode having an elongated portion extending into and at least nearly filling said slot so as to form with said wall means a substantially continuous surface bounding said bore; and elongated radially outwardly expansible spreading means received in said bore and cooperating with said wall means to press a rolled sheet received therebetween against said wall means with the overlapping edge portions of the sheet abutting against said elongated portion of said electrode for conforming the outline of the rolled sheet to the outline of said substantially continuous surface.

References Cited by the Examiner

UNITED STATES PATENTS

| | | | |
|---|---|---|---|
| 2,461,372 | 2/49 | Collins | 156—380 |
| 2,603,579 | 7/52 | Kramer | 156—380 XR |

EARL M. BERGERT, *Primary Examiner.*